United States Patent [19]

Saitoh et al.

[11] Patent Number: 5,037,581
[45] Date of Patent: Aug. 6, 1991

[54] ELECTROCONDUCTIVE COATING MATERIAL

[75] Inventors: Hachiro Saitoh, Yokosuka; Tadamitsu Nakamura, Kitakatsushika; Hiromichi Wada, Yashio; Yoshikazu Igarashi, Noda, all of Japan

[73] Assignees: Nippon Petrochemicals Co., Ltd.; Dainichiseika Color & Chemicals Mfg. Co., Ltd., both of Tokyo; Nihon Sanmo Dyeing Co., Ltd., Kyoto, all of Japan

[21] Appl. No.: 428,120

[22] Filed: Oct. 27, 1989

[30] Foreign Application Priority Data

Oct. 31, 1988 [JP] Japan ................. 63-275371

[51] Int. Cl.$^5$ .............................. A01B 1/06
[52] U.S. Cl. ................... 252/518; 252/500; 524/413; 524/420
[58] Field of Search ............... 252/500, 518; 524/401, 524/413, 420; 260/DIG. 15, DIG. 17, DIG. 21; 106/480

[56] References Cited

U.S. PATENT DOCUMENTS 4,670,189  6/1987  Tomibe et al. ................. 252/518

FOREIGN PATENT DOCUMENTS 60-60168   4/1985  Japan .
62-179573  8/1987  Japan .
62-180903  8/1987  Japan .
62-201976  9/1987  Japan .
63-6069    1/1988  Japan .

Primary Examiner—Josephine Barr
Attorney, Agent, or Firm—Scully, Scott, Murphy & Presser

[57] ABSTRACT

An improved electroconductive coating material containing electroconductive organic fiber of $10^2$ Ω·cm or lower in specific resistance, and preferably the organic fiber is 0.1 to 5 mm in length and 2 to 500 in aspect ratio. The coating material of the invention can form an improved uniform coating film which is excellent in electroconductivity and anti-static property, and it is hardly peeled off with maintaining its advantageous properties for a long period of time.

4 Claims, No Drawings

ELECTROCONDUCTIVE COATING MATERIAL

BACKGROUND OF THE INVENTION

(1) Field of the Invention

This invention relates to an electroconductive coating material. More particularly, the invention relates to an electroconductive coating material which is used to impart electroconductivity to surfaces of nonconducting materials or to impart anti-static property to goods which should be prevented from electrostatic charges.

(2) Description of Prior Art

As electroconductive coating materials used for imparting electroconductivity to the surfaces of nonelectroconductors, there are hitherto proposed several kinds of coating materials which contain powder or fiber material of electroconductors such as metals or carbon black. Such art is employed widely to a considerable extent in industrial practice, however, there remains various kinds of problems to be solved.

For example, even though a method to blend an electroconductive powder is easily carried out, it is necessary to mix the powder as much as 20 to 40% into a coating material. Accordingly, this method raises the production cost of coating material.

As compared with the use of powder material, the necessary quantity of fibrous material is smaller to obtain a certain effect. However, because the fibrous materials are inorganic substances likewise in the case of powder mixing method, the coating film is liable to be peeled off to reduce the effect, at the same time, the peeled broken pieces will make surroundings dirt. In addition, the dispersibility of blended substance in coating material is not good because the specific gravity of blended substance is large, which makes the formation of uniform coating difficult.

Furthermore, when numerous fibrous materials are protruded from the surface of coating in the form of needles, excellent anti-static effect can be expected by the effect of lightning rod. However, the needle-like tips are liable to be broken by external force such as contact and friction and the effect of lightning rod is rapidly lowered.

Meanwhile, the method to apply a solution of an anti-static agent solution is inexpensive and relatively easy to be carried out, however, it is quite difficult to reduce a surface specific resistance to a level lower than $10^8$ $\Omega \cdot cm$. What is worse, it is not desirable in practice because the attained anti-static property is not good enough and is lost within a period from 1 month to 1 year.

BRIEF SUMMARY OF THE INVENTION

It is therefore an object of the present invention to settle the above-mentioned problems in the prior art.

Another object of the present invention is to provide an improved electroconductive coating material containing electroconductive organic fiber of $10^2$ $\Omega \cdot cm$ or lower in specific resistance in order to solve the above problems.

A further object of the present invention is to provide the electroconductive coating material, with which excellent electroconductivity can be obtained by mixing a relatively small quantity of electroconductive fiber, in addition, the dispersibility of the electroconductive fiber is quite good and the anti-static property of obtained coating film lasts long.

DETAILED DESCRIPTION OF THE INVENTION

The electroconductive coating material according to the present invention contains electroconductive organic fiber of $10^2$ $\Omega \cdot cm$ or lower in specific resistance. More preferably, the electroconductive organic fiber is within the ranges of 0.1 to 5 mm in length and 2 to 500 in aspect ratio.

In a preferable embodiment of the present invention, the electroconductive coating material contains an electroconductive organic fiber made of acrylic fiber which is combined with copper sulfide.

The electroconductive organic fibers used in the present invention is exemplified by natural fibers such as cotton, wool, silk and linen; or synthetic organic fibers such as acrylic, polyamide and polyester fibers which are applied with metal plating; fibrous materials which are made from synthetic resins blended with metal powders; other fibrous materials in which metal powders are deposited in fine pores of the fibers; and organic fibers in which metallic compounds are bonded by chemical treatment. Among them, the material obtained by chemical treatment is most desirable because the preparation process is simple and easy and the effect of obtained product is large.

As the above-mentioned metals, gold, silver, copper, aluminum, nickel and the like are generally used. Among them, copper is most preferable because it is inexpensive and has good electroconductivity. Furthermore, as the organic fibers, acrylic fiber is most preferable because the strength of bonding with metal is large. Incidentally, the term acrylic fiber includes various kinds of fibers containing much acrylonitrile and other fibers containing much copolymer components.

In order to combine the acrylic fiber and copper sulfide, the above-mentioned acrylic fiber within the foregoing ranges of length and aspect ratio is chemically treated by copper sulfide. Or long fiber is previously chemically treated and then it is cut down to the above-mentioned size.

As described above, the length of fiber is within the range of 0.1 to 5 mm. In the case that each fiber is shorter than 0.1 mm, the production cost of fiber is high because it is difficult to make such a short fiber. On the other hand, when the fiber is longer than 5 mm, the dispersibility of the fiber is not good and uniform coating is difficult.

It is preferable that the aspect ratio of electroconductive organic fiber is in the range of 2 to 500. If the aspect ratio of fiber is smaller than 2, the full effect of lightning rod cannot be produced, which reduces the anti-static property. On the other hand, when the aspect ratio of fiber is larger than 500, the fiber is not desirable because the handling of the fiber is troublesome.

The specific gravity of the organic fiber to be used for the coating material of the invention is close to one because it is organic substance. Accordingly, the dispersibility of the organic fiber is good.

In order to stick tightly the organic fiber to a surface of substrate to be coated, various kinds of natural or synthetic resins may be added in addition to the electroconductive organic fiber. Furthermore, if necessary, coloring agents such as dyestuffs or pigments and other additives can be incorporated.

These resins, coloring agents and additives may be those used for the conventional coating materials.

For example, the resins are exemplified by acrylic resin, polyurethane resin, polyamide resin, vinyl chloride resin, vinyl chloride-vinyl acetate copolymer, polyester resin, epoxy resin and phenol resin.

The coloring agents are exemplified by dyestuffs and organic pigments such as those of azo type, anthraquinone type, indigo type, flavanthrone type, perylene type, perynone type, indanthrone type, quinacridone type and copper phthalocyanine type; inorganic pigments such as titanium oxide, carbon black, cobalt blue, chrome yellow, iron oxide, silica, alumina, talc and clay; other coloring powders which are made by adding dispersing agents to these dyestuffs or pigments; and aqueous coloring agents and oil coloring agents which are made by dispersing these dyestuffs or pigments in aqueous medium or oil medium.

The additives are exemplified by antiseptic agents, antigelling agents and thickeners.

The term "coating material" herein referred to includes paints, varnishes, enamels or the like of aqueous synthetic resin coating materials, oil based synthetic resin coating materials and emulsion type coating materials.

Furthermore, within the scope of the present invention, other additives such as antioxidants and UV absorbers can also be added to the composition of the coating material.

An exemplar composition of the electroconductive coating material according to the present invention is shown in the following.

| | |
|---|---|
| Electroconductive organic fiber | 3–15% by weight |
| Binder resin | 20–40% by weight |
| Coloring agent | 1–20% by weight |
| Medium | 20–50% by weight |

As described above, the electroconductive substance to be added to the electroconductive coating material of the present invention is an electroconductive organic fibrous material which has specified values of specific resistance and aspect ratio. Therefore, the coating material can produce excellent anti-static property because it exhibits excellent electroconductivity with a small quantity of the organic fiber and it produces the effect of lightning rod.

In the following, the present invention will be described in more detail with reference to examples.

EXAMPLE 1

A yellow electroconductive coating material was prepared by mixing uniformly the following composition with a high speed stirrer.

| | |
|---|---|
| Ethylene-vinyl acetate emulsion (Solid content: 55 wt. %) | 62 wt. parts |
| Acrylic fiber-copper sulfide combined fiber (Trademark: THUNDERON made by Nihon Sanmo Dyeing Co., Ltd. Length 0.5 mm; Specific resistance 7 × $10^{-1}$ Ω · cm; Aspect ratio: 30) | 8 wt. parts |
| Aqueous coloring agent (Trademark: EP-65 WHITE made by Dainichiseika Color & Chemicals Mfg. Co., Ltd. Solid content 63 wt. %) | 25 wt. parts |
| Aqueous coloring agent (Trademark EP-130 YELLOW made by Dainichiseika Color & Chemicals Mfg. Co., Ltd. Solid content: 32 wt.) | 0.5 wt. part |
| Water | 4.5 wt. parts |

To 100 parts by weight of this electroconductive coating material was added 15 parts by weight of water to dilute and was put into a spray gan of 2.5 mm aperture. The coating material was then sprayed to the surface of a foamed polystyrene article to form a coating film of 35 g/m² (dry basis). It was then dried at 50° C. for 1 minute to obtain an electroconductive foamed polystyrene article which had a coating film of good film strength on the surface.

The surface specific resistance of this electroconductive article was 5 × $10^4$ Ω/□.

EXAMPLE 2

| | |
|---|---|
| Acrylic ester emulsion (Solid content: 45 wt. %) | 62 wt. parts |
| Acrylic fiber-copper sulfide combined fiber (Trademark: THUNDERON made by Nihon Sanmo Dyeing Co., Ltd. Length: 1.0 mm; Specific resistance: 6 × $10^{-2}$ Ω · cm; Aspect ratio: 50) | 5 wt. parts |
| Aqueous coloring agent (Trademark: EP-65 WHITE made by Dainichiseika Color & Chemicals Mfg. Co., Ltd. Solid content: 63 wt. %) | 25 wt. parts |
| Aqueous coloring agent (Trademark: EP-520 BLUE made by Dainichiseika Color & Chemicals Mfg. Co., Ltd. Solid content: 35 wt.) | 0.5 wt. part |
| Water | 7.5 wt. parts |

A light blue electroconductive coating material was prepared by mixing uniformly the above composition with a high speed stirrer. This electroconductive coating material was diluted in the like manner as the above Example 1 and it was sprayed to an ABS resin plate to form a coating film of 40 g/m² (dry basis), thereby obtaining an electroconductive resin plate.

The surface specific resistance of this electroconductive resin plate was 3 × $10^4$ Ω/□.

EXAMPLE 3

| | |
|---|---|
| Acrylic resin solution (Solid content: 45 wt. %) | 60 wt. parts |
| Acrylic fiber-copper sulfide combined fiber (Length: 1.0 mm; Specific resistance: 6 × $10^{-2}$ Ω · cm; Aspect ratio: 50) | 3 wt. parts |
| Acrylic fiber-copper sulfide combined fiber (Length: 0.2 mm; Specific resistance: 5 × $10^{-1}$ Ω · cm; Aspect ratio: 10) | 4 wt. parts |
| Oil coloring agent (Trademark: HSC 03 WHITE made by Dainichiseika Color & Chemicals Mfg. Co., Ltd. Solid content: 46 wt. %) | 10 wt. parts |
| Oil coloring agent (Trademark: HSC 433 YELLOW made by Dainichiseika Color & Chemicals Mfg. Co., Ltd. Solid content: 32 wt.) | 2 wt. parts |
| Butyl alcohol | 6 wt. parts |
| Toluene | 15 wt. parts |

A light yellow electroconductive coating material was prepared by mixing uniformly the above composition with a high speed stirrer. This electroconductive coating material (100 parts by weight) was diluted by adding 20 parts by weight of a mixed solvent of butyl alcohol/toluene. This coating material was put into a spray gan of 2.5 mm aperture and it was sprayed to a foamed polypropylene article to form a coating film of 40 g/m² (dry basis). It was then dried at 80° C. for 1 minute to obtain an electroconductive foamed polypropylene article which had an electroconductive coating film of good film strength on the surface.

The surface specific resistance of this electroconductive foamed article was $4 \times 10^5$ Ω/□.

EXAMPLE 4

A coating material of the same composition as that of the coating material in Example 1 was sprayed to a foamed polystyrene article to form a coating film of 22 g/m² (dry basis) and it was then dried at 50° C. for 1 minute.

Because the quantity of coating material on this coated article was smaller than the case in Example 1, the surface specific resistance was $4 \times 10^{12}$ Ω/□. However, the half-life in the attenuation of electrical charge was as good as 1.5 seconds when measured under ordinary conditions with STATIC HONEST-METER (trademark, made by Shishido Electrostatic Co., Ltd.) at an applied voltage of 10 kV.

COMPARATIVE EXAMPLE 1

A coating material was prepared with the same composition as that in Example 1 except that electroconductive whisker (fiber diameter: 0.5 micron; fiber length: 20 micron; specific resistance: $10^1 - 10^2$ Ω·cm) was used in place of the acrylic fiber-copper sulfide combined fiber. Spray coating on a foamed polystyrene article was carried out using the same quantity of the coating material.

The surface specific resistance of this coated article was $7 \times 10^{12}$ Ω/□, so that the effect to impart electroconductivity was not especially observed. Furthermore, in the like manner as in Example 4, the attenuation of electrical charge was measured by the STATIC HONEST-METER, where the the attenuation of electrical charge was as long as more than 60 seconds in half-life time.

As described above, the electroconductive materials mixed in the electroconductive coating material according to the present invention are electroconductive organic fibers having the values of specific resistance and aspect ratio within specific ranges. Therefore, even when the addition quantity of the electroconductive material is small, excellent electroconductivity can be attained. In addition, excellent anti-static property can be expected because the formed coating film has an effect of lightning rod.

Furthermore, as the specific gravity of the electroconductive organic fiber is close to 1, it can be well dispersed in the coating material to facilitate uniform coating.

Still further, in comparison with the conventional case in which metal powder or metal fiber is used, the coated film of the invention is hardly peeled off and the contained fibers are not snapped off by external force such as friction, which brings about semipermanent effect.

In addition, the fiber which is combined with copper ions has not only the above electroconductivity and anti-static property but also antiseptic and deodorant effects. Therefore, when the coating material of the present invention is applied to containers, it is quite useful as the casings for fish and other foodstuffs and the antiseptic effect and deodorant effect are not lost during the vigorous washing. Accordingly, the field of use of the coating material according to the present invention can be much enlarged.

What is claimed is:

1. An electroconductive coating material which comprises:
   (a) a binder and solvent therefor, and
   (b) an electroconductive organic acrylic fiber combines with copper sulfide characterized by a specific resistance of no more than $10^2$ ●·cm, said fiber being 0.1 to 5 mm in length and 2 to 500 in aspect ratio.

2. The electroconductive coating material in claim 1 wherein said coating material is able to form, on a molded article, a coating film having a half-life period of 5 seconds or less when the electrostatic charge and its attenuation are measured under applied voltage of 10 kV by a coulomb attenuation method.

3. The electroconductive coating material in claim 1 wherein said coating material is an emulsion coating material comprising at least one member selected from the group consisting of acrylic ester resin emulsion, ethylene-vinyl acetate resin emulsion, polyurethane resin emulsion, and vinyl acetate resin emulsion.

4. The electroconductive coating material in claim 1 wherein said coating material is a solvent coating material comprising an organic solvent solution of at least one member selected from the group consisting of acrylic resin, polyurethane resin, vinyl chloride resin, vinyl chloride vinyl acetate copolymer resin, polyester resin, epoxy resin and phenol resin.

* * * * *

UNITED STATES PATENT AND TRADEMARK OFFICE
CERTIFICATE OF CORRECTION

PATENT NO. : 5,037,581

DATED : August 6, 1991

INVENTOR(S) : Hachiro Saitoh, et al.

It is certified that error appears in the above-identified patent and that said Letters Patent is hereby corrected as shown below:

Column 6, line 25, Claim 1: "$10^2 \bullet \cdot cm$" should read as --$10^2 \, \Omega \cdot cm$--

Signed and Sealed this

Twenty-third Day of February, 1993

*Attest:*

STEPHEN G. KUNIN

*Attesting Officer*     *Acting Commissioner of Patents and Trademarks*